United States Patent
Sarkar et al.

(10) Patent No.: US 8,060,128 B1
(45) Date of Patent: Nov. 15, 2011

(54) INTELLIGENCE IN POWER CONTROL ALGORITHM

(75) Inventors: Debasish Sarkar, Irvine, CA (US); Sachin R. Vargantwar, Overland Park, KS (US); Siddharth S. Oroskar, Overland Park, KS (US); Deveshkumar Rai, Overland Park, KS (US); Manoj Shetty, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 403 days.

(21) Appl. No.: 12/405,344

(22) Filed: Mar. 17, 2009

(51) Int. Cl.
*H04B 7/00* (2006.01)
*H04B 1/00* (2006.01)

(52) U.S. Cl. .......................... 455/522; 455/69

(58) Field of Classification Search ............. 455/522, 455/69; 370/318
See application file for complete search history.

(56) References Cited

U.S. PATENT DOCUMENTS

| | | | |
|---|---|---|---|
| 7,336,929 B2 * | 2/2008 | Yasuda et al. | 455/41.2 |
| 2006/0003700 A1 * | 1/2006 | Yasuda et al. | 455/41.2 |
| 2007/0026812 A1 * | 2/2007 | Hu et al. | 455/69 |

* cited by examiner

*Primary Examiner* — Daniel D Chang

(57) ABSTRACT

A method and system is disclosed for intelligent power control in a wireless communication system. In accordance with an example embodiment, a first device will operate in a dynamic-power state in which it responds to each power-increment command and power-decrement command received from a second device by incrementing or decrementing transmission power on an air interface. While operating in the dynamic-power state, the first device will recognize when a first threshold number of alternating power-increment and power-decrement commands have been received, and responsively will transition to operating in a steady-power state in which it no longer increments or decrements transmission power in response to power-control commands from the second device. While operating in the steady-power state, the first device will recognize when receives a particular sequence of power-control commands from the first device, and based at least on the recognition will transition to operating in the dynamic power state.

24 Claims, 8 Drawing Sheets

INTELLIGENCE IN POWER CONTROL ALGORITHM

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennas in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When an access terminal (such as a cellular telephone, pager, or appropriately equipped portable computer, for instance) is positioned in a cell, the access terminal (also referred to herein by "AT") communicates via an RF air interface with the BTS antenna of the cell. Consequently, a communication path is established between the AT and the transport network, via the air interface, the BTS, the BSC and the switch or gateway. Functioning collectively to provide wireless (i.e., RF) access to services and transport in the wireless communication system, the BTS, BSC, MSC, and PDSN, comprise (possibly with additional components) what is typically referred as a Radio Access Network (RAN).

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennas. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

As an access terminal moves between wireless coverage areas of a wireless communication system, such as between cells or sectors, or when network conditions change or for other reasons, the AT may "hand off" from operating in one coverage area to operating in another coverage area. In a usual case, this handoff process is triggered by the access terminal monitoring the signal strength of various nearby available coverage areas, and the access terminal or the BSC (or other controlling network entity) determining when one or more threshold criteria are met. For instance, the AT may continuously monitor signal strength from various available sectors and notify the BSC when a given sector has a signal strength that is sufficiently higher than the sector in which the AT is currently operating. The BSC may then direct the AT to hand off to that other sector.

In some wireless communication systems or markets, a wireless service provider may implement more than one type of air interface protocol. For example, a carrier may support one or another version of CDMA, such as EIA/TIA/IS-2000 Rel. 0, A (hereafter "IS-2000") for both circuit-cellular voice and data traffic, as well as a more exclusively packet-data-oriented protocol such as EIA/TIA/IS-856 Rel. 0, A, or other version thereof (hereafter "IS-856"). Access terminals operating in such systems may be capable of communication with either or both protocols, and may further be capable of handing off between them, in addition to being able to hand off between various configurations of coverage areas.

OVERVIEW

An AT receives data from a base station on a "forward link" and sends data to the base station on a "reverse link." Hence, on the forward link, the base station transmits and the access terminal receives, while on the reverse link, the access terminal transmits and the base station receives. Under CDMA and related protocols, the transmission power of a "sending entity" (base station on the forward link, access terminal on the reverse link) is adjusted according to an adaptive power-control protocol that uses to a form of feedback from a "receiving entity" (access terminal on the forward link, base station on the reverse link). Specifically, the receiving entity monitors an error rate of data received from a particular sending entity in order to dynamically set a threshold level of received power from the particular sending entity that needs to be achieved in order to maintain the error rate at some preset, acceptable level. As operating conditions change, the receiving entity may adjust the threshold level accordingly. The receiving entity also continually compares the actual received power from the particular sending entity with the threshold level, and then sends power-control commands to the particular sending entity that instruct the particular sending entity to adjust its transmission power level so as to achieve the threshold level, as measured at the receiving entity. The error-rate monitoring and dynamic setting of the threshold level are carried out on a time scale that is long compared with than that used for sending the power-control commands. Thus, the dynamic setting of the threshold is aimed at responding to relatively gradual changes in received-power requirements, while the power-control commands are aimed at relatively rapid achievement of received-power requirements once they have been determined according to the threshold level.

Each power-control command is typically either a "power-increment" command, instructing the sending entity to increase its transmission power by small amount, or a "power-decrement" command, instructing the sending entity to decrease its transmission power by small amount. In practice, the receiving entity sends a continuous stream or sequence of periodic power-control commands to the sending entity. The process of achieving the received-power threshold at the receiving entity can be thought of conceptually as a sort of "coarse" adjustment that brings the actual received power to near-convergence with the threshold level, followed by continuous "fine" adjustments aimed at keeping the actual received power very close to the threshold level (until another coarse adjustment becomes necessary). The coarse adjustment compensates for roughly discontinuous shifts between the actual received power and the threshold level (e.g., when the threshold level is adjusted, or operating conditions suddenly change), and typically entails the sending entity responding to a sequence of consecutive power-increment commands or consecutive power-decrement commands from the receiving entity. The fine adjustments generally comprise a sequence of alternating power-increment and power-decrement commands that cause the actual received power to fluctuate slightly above and below the threshold as the sending entity sequentially responds to each command.

It may occur that the threshold level determined by a receiving entity for a particular sending entity remains stable (unchanged) for a relatively long interval of time, resulting in a long interval of fine adjustments. When this happens, the particular sending entity will cycle through a correspondingly large number of alternating power increments and power decrements of its transmission power in response to alternating power-increment and power-decrement commands sent from the receiving entity as the receiving entity detects received power alternatingly below and above the threshold. The alternating power increments and power decrements of the sending entity's transmission power over the course of time when the threshold level is stable can be an inefficient use of the sending entity's transmission power. When the sending entity is an access terminal, the inefficiency could also have a negative impact on performance and/or battery life. In any case, it would advantageous if the sending entity could recognize when it is operating under conditions of a stable threshold (as seen by the receiving entity), and responsively cease responding to power-control commands until responding to power-control commands is once again appropriate or necessary.

Hence in one respect, various embodiments of the present invention provide, in a first device communicatively coupled with a second device via an air interface, a method comprising: operating in a dynamic-power state in which the first device increases transmission power on the air interface by an incremental amount in response to each of one or more power-increment commands received from the second device and decreases transmission power on the air interface by a decremental amount in response to each of one or more power-decrement commands received from the second device; while operating in the dynamic-power state, upon receiving a first sequence of a first threshold number of alternating power-increment and power-decrement commands from the second device, transitioning to operating in a steady-power state in which the first device makes no adjustment of transmission power on the air interface in response to receiving power-increment commands from the second device and makes no adjustment of transmission power on the air interface in response to receiving power-decrement commands from the second device; while operating in the steady-power state, making a determination that a particular sequence of power-increment commands and power-decrement commands has been received from the second device; and based at least on the determination, transitioning from operating in the steady-power state to operating in the dynamic-power state.

In another respect, various embodiments of the present invention provide, in a first device communicatively coupled with a second device via an air interface, a method comprising: operating in a dynamic-power state in which the first device adjusts transmission power on the air interface in accordance with types of received power-control commands by increasing transmission power on the air interface by an incremental amount in response to each of one or more power-increment commands received from the second device and decreasing transmission power on the air interface by a decremental amount in response to each of one or more power-decrement commands received from the second device, each power-increment command being one of two opposite types of power-control command, and each power-decrement command being the other of the two opposite types of power-control command; while operating in the dynamic-power state, upon receiving a first sequence of a first threshold number of alternating types of power-control commands from the second device, the first sequence ending with a last power-control command, transitioning to operating in a steady-power state in which the first device makes no adjustment of transmission power on the air interface in response to receiving power-control commands of either type from the second device; while operating in the steady-power state, upon receiving from the second device a second sequence of a second threshold number of consecutive power-control commands all of a type opposite that of the last power-control command, the second sequence ending with a final power-control command, adjusting transmission power on the air interface in accordance with the type of the final power-control command, and transitioning to operating in a quasi-dynamic-power state in which the first device waits to receive a power-control command; and while operating in the quasi-dynamic-power state, upon receiving from the second device a new power-control command immediately subsequent to receiving the final power-control command, adjusting transmission power on the air interface in accordance with the type of the new power-control command, and transitioning to operating in (i) the steady-power state if the type of the new power-control command is opposite that of the final power-control command, or (ii) the dynamic-power state if the type of the new power-control command is the same as that of the final power-control command.

In yet another respect, various embodiments of the present invention provide, in a first device communicatively coupled with a second device via an air interface, an improvement comprising: means for operating in a dynamic-power state in which the first device adjusts transmission power on the air interface in accordance with types of received power-control commands by increasing transmission power on the air interface by an incremental amount in response to each of one or more power-increment commands received from the second device and decreasing transmission power on the air interface by a decremental amount in response to each of one or more power-decrement commands received from the second device, wherein each power-increment command is one of two opposite types of power-control command, and each power-decrement command is the other of the two opposite types of power-control command; means for, while operating in the dynamic-power state, upon receiving a first sequence of a first threshold number of alternating types of power-control commands from the second device, wherein the first sequence ends with a last power-control command, transitioning to operating in a steady-power state in which the first device makes no adjustment of transmission power on the air interface in response to receiving power-control commands of either type from the second device; means for operating in the steady-power state and for, while operating in the steady-power state, upon receiving from the second device a second sequence of a second threshold number of consecutive power-control commands all of a type opposite that of the last power-control command, wherein the second sequence ends with a final power-control command, adjusting transmission power on the air interface in accordance with the type of the final power-control command, and transitioning to operating in a quasi-dynamic-power state in which the first device waits to receive a power-control command; and means for operating in the quasi-dynamic-power state and for, while operating in the quasi-dynamic-power state, upon receiving from the second device a new power-control command immediately subsequent to receiving the final power-control command, adjusting transmission power on the air interface in accordance with the type of the new power-control command, and transitioning to operating in (i) the steady-power state if the type of the new power-control command is opposite that of the final power-control command, or (ii) the dynamic-power state if the type of the new power-control command is the same as that of the final power-control command.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

The present invention will be described by way of example with reference to Code Division Multiple Access ("CDMA") communications in general, and to IS-856 and IS-2000 communications in particular. As described below, IS-2000 applies to both circuit-cellular and packet-data communications, and is referred to herein as "conventional" CDMA communications. IS-856 applies more exclusively to packet-data communications (including, e.g., real-time voice and data applications), and is referred to herein as "high rate" packet-data communications. It should be understood that the present invention can apply to other wireless voice and data protocols including, without limitation, IS-95 and GSM, which, together with IS-856 and IS-2000 are considered herein, individually or in combination, to comprise a CDMA family of protocols.

Figure 1:
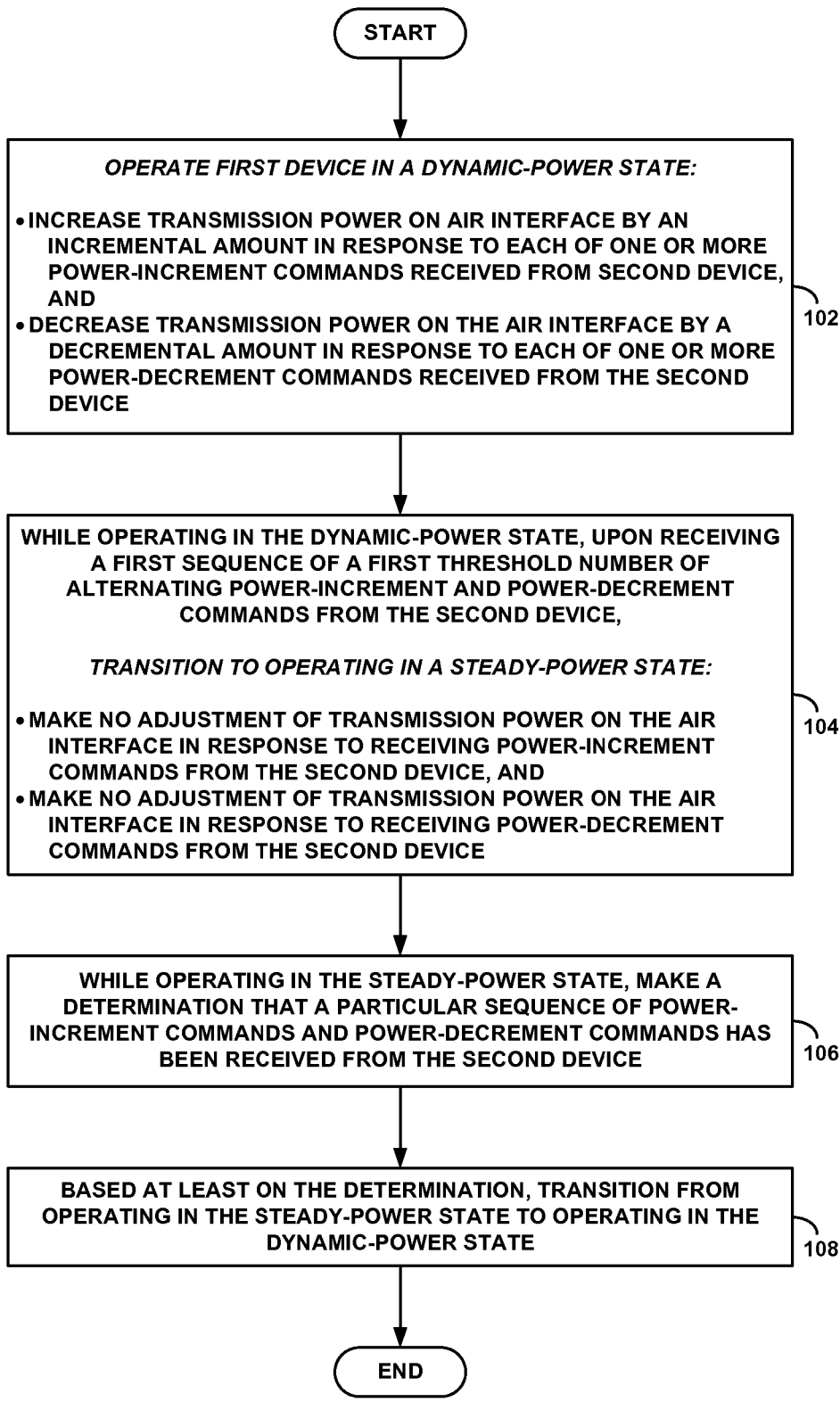
FIG. 1 is a flowchart illustrating an example embodiment of intelligent power control.

FIG. 1 is a flowchart illustrating an example embodiment of intelligent power control. The context for the example embodiment is a first device communicatively coupled with a second device via an air interface, wherein the steps of the flowchart are implemented in the first device. By way of example, the first and second devices could be in and/or be part of a wireless communication system that operates according to a CDMA family of protocols, and the air interface could be an RF interface. More particularly, the first device is taken to be a sending entity defined in accordance with the brief description above, and the second device is taken to be a receiving entity also defined in accordance with the description above. Thus, in one configuration, the first device could be an access terminal and the second device a base station, and in another configuration, the first device could be a base station and the second device an access terminal. FIG. 1 applies to either or both configurations, and the example embodiment should be considered as encompassing an implementation of the steps of FIG. 1 in at least either or both an access terminal and a base station.

In the discussion of FIG. 1, as well as in other discussions and explanations herein, the terms "first" and "second" as applied to "devices," "sequences," "thresholds," and "threshold numbers" are used as identifying labels, and not meant to imply any numerical ordering (although a numerical ordering is not necessarily excluded). Additionally, reference herein to sequences of power-control commands should be understood to define groupings of temporally sequenced power-control commands. For example, "receiving a sequence of power-control commands" should be taken to mean receiving the power-control commands of the sequence one command after the other in time.

At step 102, the first device operates in a "dynamic-power state," in which the first device responds to power-control commands from the second device in accordance with the CDMA power-control protocols described above. Specifically, for each of one or more power-increment commands received at the first device from the second device, the first device increases the transmission power on its air interface by an incremental amount. Similarly, for each of one or more power-decrement commands received at the first device from the second device, the first device decreases the transmission power on its air interface by a decremental amount. In accordance with CDMA power-control protocols, and as described in more detail below, power-control commands are sent by the receiving entity (second device in the example embodiment) at rate of 800 per second (although other rates could be used), each power-increment command is a "power-up" command, and each power-decrement command is a "power-down" command. Further, the incremental and decremental amounts of transmission power could be specified as absolute amounts of power, but are typically specified as fractions of a current transmission power level on the air interface, wherein the "current transmission power level" is the transmission power level at the time that the increase or decrease is applied.

In practice, the transmission power level on the air interface is specified as a gain level, x, according to the relation x dBm=10 $\log_{10}$(P/1 mW), where P is the power in mW (milliwatts), and each incremental amount or decremental amount is specified to be 1 dB with respect to the current level (although other quantities of dBs could be used). As such, while operating in the dynamic-power state, the first device increases transmission power on its air interface by 1 dB for each power-up command that it receives, and decreases its transmission power by 1 dB for each power-down command that it receives. Note that a 3 dB change (up or down) corresponds to a factor of two in absolute power (increase or decrease).

At step 104, while the first device is still operating in the dynamic-power state, upon receiving a first threshold number of alternating power-increment and power-decrement commands, the first device transitions to a "steady-power state." In the steady power state, the first device makes no adjustments to the transmission power on its air interface in response to receiving any power-control commands (power-ups or power-downs). Since alternating power-increment and power-decrement commands generally indicate that a sending entity is transmitting on its air interface at a roughly constant power level that achieves the received-power threshold at a receiving entity, the number of alternating commands received provides an indication of how long the threshold power level has been achieved. Hence, the first threshold number of alternating commands corresponds to a threshold duration of time of stable power operation of the first device with respect to the threshold power level.

By determining that it has received the first threshold number of alternating power-increment and power-decrement commands, the first device (sending entity) advantageously can recognize that it is transmitting at a stable power level with respect to the threshold power level at the second device (receiving entity). By transitioning to the steady-power state upon this recognition, the first device can advantageously avoid any inefficiencies (or other negative impacts) of alternatingly increasing and decreasing transmission power on its air interface.

In accordance with the example embodiment, in addition to adjusting transmission power on its air interface in response to each received power-control command (while in the dynamic-power state), the first device can keep track of the received power-control commands in order to determine if and when it has received the first threshold number of alternating power-increment and power-decrement commands. For instance, the first device may accumulate a count of alternating power-increment and power-decrement commands in some form of memory (such as internal "random-access memory" or magnetic disk). Note that the first threshold number could correspond to a number of pairs of alternating power-increment and power-decrement commands, or instead to a total number of power-control commands in a sequence comprised of strictly alternating power-increment and power-decrement commands. Additionally, the first threshold number of alternating power-increment and power-decrement commands could correspond to a sequence of power-control commands that begins with either a power-increment command or a power-decrement command, and similarly ends with either a power-increment command or a power-decrement command.

In a wireless communication system that operates according to a CDMA family of protocols, data on either the forward or reverse links may be transmitted in regular units called "frames" (this is explained in more detail below). Each frame typically corresponds to 20 milliseconds (ms) duration. Since, as noted above, power-control commands are sent at a rate of 800 per second, 16 power-control commands can be sent over the duration of one frame interval. In further accordance with the example embodiment, the first threshold number corresponds to a non-zero, positive integer number of CDMA frames. For instance, the first threshold number could correspond to two frames, although other numbers of frames could be used. The reason for specifying the first threshold number in terms of frames is that, as explained below, the error rate used to determine the threshold power level at the receiving entity is typically measured over intervals of integer numbers of frames.

At step 106, while operating in the steady-power state, the first device continues to keep track of the sequences of power-control commands that it receives from the second device, and makes a determination as to if and when a particular sequence of power-increment and power-decrement commands is received. For example, since the first device does not respond to power-control commands while in the steady-power stated, the second device may try to compensate by sending consecutive power-increment commands or consecutive power-decrement commands. Hence, in accordance with the example embodiment, making the determination that the particular sequence of power-increment and power-decrement commands has been received could comprise making a determination that either a second threshold number of consecutive power-increment commands or a third threshold number of consecutive power-decrement commands has been received.

Alternatively, making the determination that the particular sequence of power-increment and power-decrement commands has been received could comprise making a determination that both a second threshold number of power-increment commands and a third threshold number of power-decrement commands has been received. As a further aspect of this alternative form of making the determination, the first device could compute the net adjustment in transmission power on its air interface that would result from responding to all of both the second threshold number of power-increment commands and a third threshold number of power-decrement commands. The first device could then determine if the net adjustment would place the transmission power outside of a range about the current transmission power level. For instance, the range could be defined by a first threshold power level above the current transmission power level and a second threshold power level below the current transmission power level. If the net adjustment does exceed the range, the first device could then infer that the particular sequence of power-increment and power-decrement commands had been received.

Finally, at step 108, based at least on the determination made at step 106, the first device transitions from operating in the steady-power state to operating in the dynamic-power state. In accordance with the example embodiment, the determination made at step 106 is used by the first device (sending entity) as an indication that the transmission power of its air interface is not satisfying the threshold level at the second device (receiving entity). Thus, by making the determination at step 106, the first device advantageously can recognize that it is no longer transmitting at a stable power level with respect to the threshold power level at the second device. By transitioning to the dynamic-power state based at least upon this recognition, the first device can advantageously once again respond to power-control commands so as to adjust the transmission power on its air interface to achieve the threshold level at the second device.

Basing the transition of the first device from the steady-power state to the dynamic-power state at least on the determination made at step 106 should be understood to mean that the determination is a necessary condition, but not necessarily a sufficient condition for the transition. In particular, while the determination made at step 106 indicates an operating condition in which the first device is not transmitting at a power level that satisfies the threshold level at the second device, that operating condition might be temporary or transient, such that the first device could return to stable power operation by responding to just one or a few power-control commands from the second device. In this case, it would be advantageous for the first device to briefly exit from the steady-power state, make a small adjustment to its transmission power, and then return to the steady-power state without ever entering the dynamic-power state. This would allow the first device to avoid having to respond again to the first threshold number of alternating power-increment and power-decrement commands before transition to the steady-power state.

In accordance with the example embodiment, the possibility that the divergence of the actual received power at the second device from the threshold level is transient or temporary can be accommodated by introducing a third operational state, namely a "quasi-dynamic-power state" (not explicitly described in FIG. 1). Thus, when the first device is operating in the steady-power state and makes the determination of step 106, the first device will respond to at least one of the power-control commands of the particular sequence (i.e., the sequence that resulted in the determination being made), and then transition to the quasi-dynamic-power state. In the quasi-dynamic-power state, the first device will determine, based on power-control commands received while in the quasi-dynamic-power state, if it should transition to the dynamic-power state or back to the steady-power state. If the divergence is transient, then the first device will transition back to the steady-power state; if not, then the first device will transition to the dynamic-power state. Since the determination of step 106 takes the first device to the quasi-dynamic-power state from which the first device might transition to the dynamic-power state, the determination of step 106 represents a necessary, but not necessarily sufficient, condition for transition of the first device from the steady-power state to the dynamic power state.

It will be appreciated that the steps of FIG. 1 are exemplary, and that additional and/or alternative steps or alternative ordering of steps could be carried out and still remain within the scope and spirit of the present invention.

Figure 2:
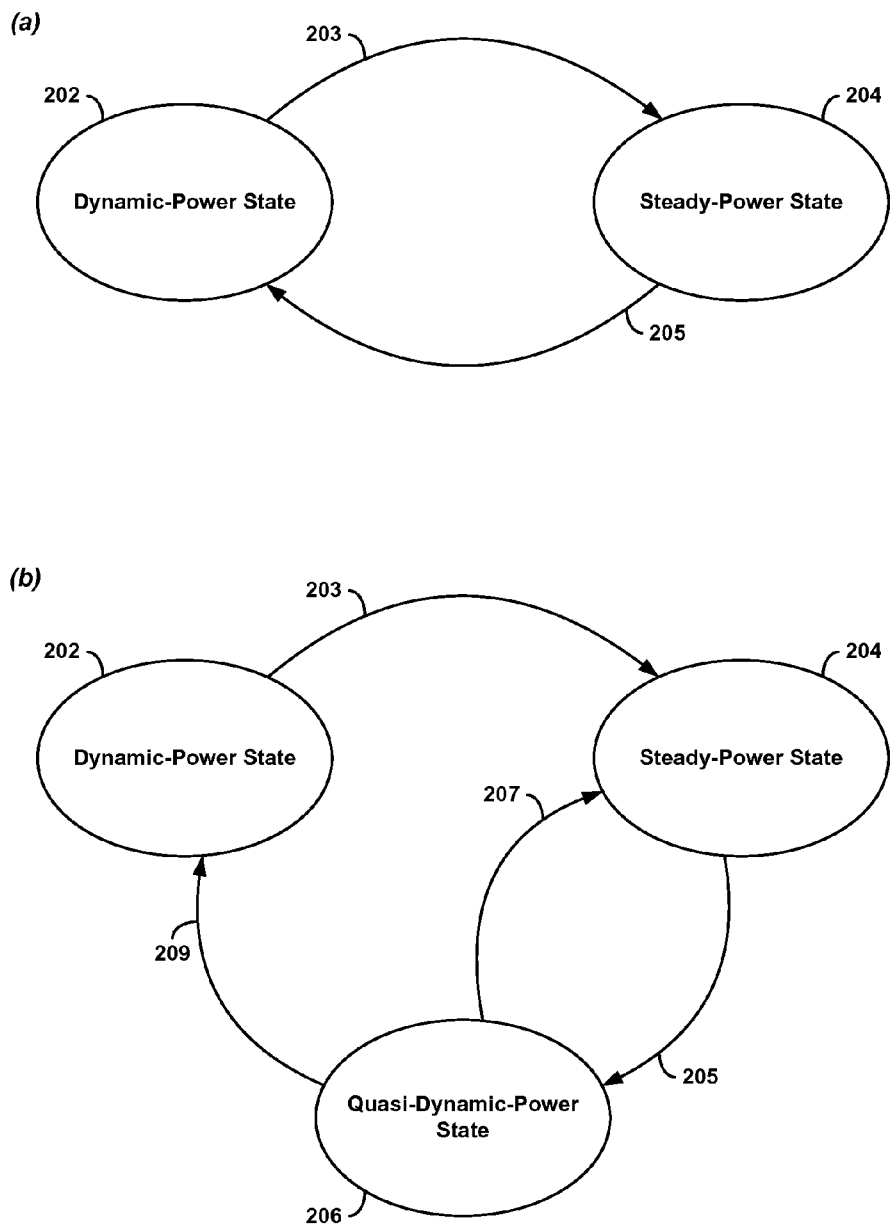
FIG. 2 illustrates example operation of intelligent power control in the form of state diagrams.

FIG. 2 illustrates the arrangement of states and transitions associated with the example embodiment of FIG. 1. The top panel (labeled "(a)") of FIG. 2 shows dynamic-power state 202 and steady-power state 204, with transition 203 from state 202 to state 204 and transition 205 from state 204 to state 202. Transition 202 corresponds to the receipt by the first device of the first threshold number of alternating power-increment and power-decrement commands. Transition 205 corresponds to (i) the determination at step 106 that the particular sequence of power-increment and power-decrement commands has been received, and (ii) any other conditions required for the transition from state 204 to state 202.

The bottom panel (labeled "(b)") of Figure illustrates the three-state description of the example embodiment. Specifically, panel (b) shows dynamic-power state 202, steady-power state 204, and quasi-dynamic-power state 206, with transition 203 from state 202 to state 204, transition 205 from state 204 to state 206, transition 207 from state 206 to state 204, and transition 209 from state 206 to state 202. As with panel (a), transition 202 corresponds to the receipt by the first device of the first threshold number of alternating power-increment and power-decrement commands. Transition 205 corresponds only to the determination at step 106 that the particular sequence of power-increment and power-decrement commands has been received. Transition 207 corresponds to a determination that the divergence of the actual received power at the second device from the threshold level was transient or temporary. Transition 209 corresponds to a determination that the divergence of the actual received power at the second device from the threshold level was not transient or temporary. Note that some of the transitions in both panels (a) and (b) may be accompanied by the first device responding to one or more power-control commands received while the first device was in a state that preceded the transition. Further details of the various state transitions are discussed below.

Figure 3:
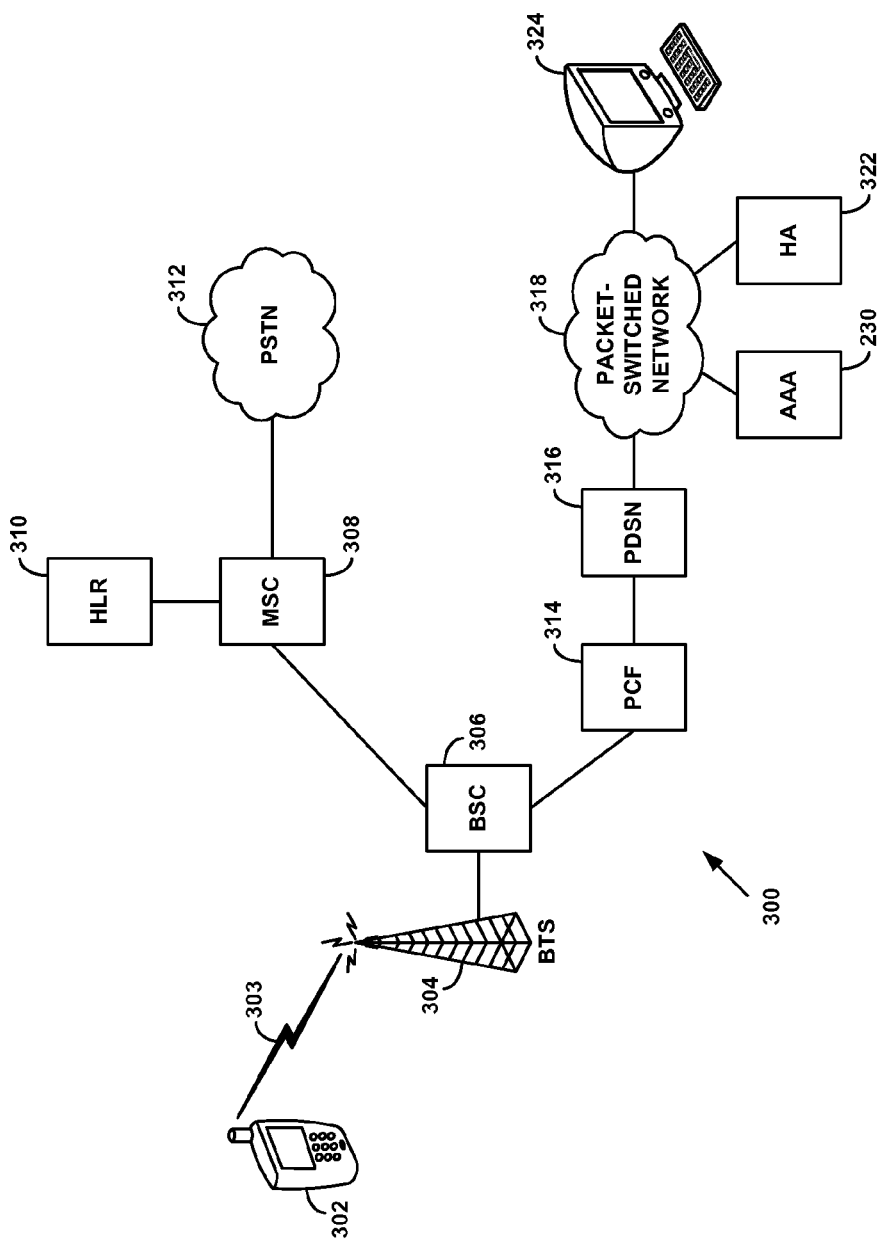
FIG. 3 is a simplified block diagram of a wireless communication system in which an example embodiment of intelligent power control can be employed.

FIG. 3 shows a simplified block diagram of a wireless communication system 300 in which an example embodiment of intelligent power control can be employed. Access terminal AT 302 communicates over an air interface 303 with a BTS 304, which is then coupled or integrated with a BSC 306. Transmissions over air interface 303 from BTS 304 to AT 302 represent the forward link to the access terminal (also referred to herein alternatively as the forward link from the base station, and as "the AT's forward link"). Transmissions over interface 303 from AT 302 to BTS 304 represent the "reverse link" (also referred to herein as "the AT's reverse link"). It will be appreciated that the arrangement shown in the figure is illustrative.

BSC 306 is connected to MSC 308, which acts to control assignment of air traffic channels (e.g., over air interface 303), and provides access to wireless circuit-switched services such as circuit-voice and circuit-data (e.g., modem-based packet data) service. As represented by its connection to PSTN 312, MSC 308 is also coupled with one or more other MSCs or other telephony circuit switches in the operator's (or in a different operator's) network, thereby supporting user mobility across MSC regions, and local and long-distance landline telephone services. Also connected to MSC 308 is home location register (HLR) 310, which supports mobility-related aspects of subscriber services, including dynamic tracking of subscriber registration location and verification of service privileges.

As shown, BSC 306 is also connected with a PDSN 316 by way of packet control function (PCF) 314. PDSN 316 in turn provides connectivity with a packet-switched network 318, such as the Internet and/or a wireless carrier's private core packet-network. Sitting as nodes on network 318 are, by way of example, an authentication, authorization, and accounting (AAA) server 320, a mobile-IP home agent (HA) 322, and a remote computer 324. After acquiring an air traffic channel over its air interface, an access terminal (e.g., AT 302) may send a request to PDSN 316 for a connection in the packet data network. Then, following authentication of the access terminal by AAA server 320, the access terminal may be assigned an IP address by the PDSN or by HA 322, and may thereafter engage in packet-data communications with entities such as remote computer 324.

It should be understood that the depiction of just one of each network element in FIG. 3 is illustrative, and there could be more than one of any of them, as well as other types of elements not shown. The particular arrangement shown in FIG. 3 should not be viewed as limiting with respect to the present invention. Further, the network components that make up a wireless communication system such as system 300 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary access terminal 302 typically comprises a user-interface, I/O components, a transceiver, a communication interface, a tone detector, a processing unit, and data storage, all of which may be coupled together by a system bus or other mechanism. As such, system 300, AT 302, and air interface 303 are representative of exemplary means of implementing and carrying out the various functions, steps, and procedures described herein.

Throughout this description, the term "base station" will be used to refer to a Radio Access Network (RAN) element such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

1. Conventional CDMA Communications

In a conventional CDMA wireless network compliant with the well known IS-2000 standard, each cell employs one or more carrier frequencies, typically 1.25 MHz in bandwidth each, and each wireless service sector is distinguished from adjacent sectors by a pseudo-random number offset ("PN offset"). Further, each sector can concurrently communicate on multiple different channels, distinguished from each other by "Walsh codes." When an access terminal operates in a given sector, communications between the access terminal and the BTS of the sector are carried on a given frequency and are encoded by the sector's PN offset and a given Walsh code.

Air interface communications are divided into forward link communications, which are those passing from the base station to the access terminal, and reverse link communications, which are those passing from the access terminal to the base station. In an IS-2000 system, both the forward link and reverse link communications in a given wireless service sector are encoded by the sector's PN offset and a given Walsh code. On the forward link, certain Walsh codes are reserved for use to define control channels, including a pilot channel, a sync channel, and one or more paging channels, and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

In order to facilitate efficient and reliable handoff of access terminals between sectors, under IS-2000 an AT can communicate on a given carrier frequency with a number of "active" sectors concurrently, which collectively make up the AT's "active set." Depending on the system, the number of active sectors can be up to six (currently). The access terminal receives largely the same signal from each of its active sectors and, on a frame-by-frame basis, selects the best signal to use. An AT's active set is maintained in the access terminal's memory, each active sector being identified according to its PN offset. The AT continually monitors the pilot signals from its active sectors as well as from other sectors, which may vary in as the AT moves about within the wireless communication system, or as other factors cause the AT's RF conditions to change. The AT reports the received signal strengths to the serving base station, which then directs the AT to update its active set in accordance with the reported strengths and one or more threshold conditions.

Data sent on both the forward and reverse links are first assembled into units called frames, which are then encoded for transmission to or from the access terminal at regular intervals (corresponding to a frame rate), typically 20 milliseconds in duration (although other frame intervals can be used). As a result of imperfect transmission, some frames received by the AT on the forward link or by the base station on the reverse link may contain errors. Other frames—ideally, the majority of them—will be received without errors. It may also be possible through one or another coding technique to correct certain errors in frames.

On either link, the receiving entity (e.g., AT or base station) can compute a ratio of (i) the number of error-containing frames received during a given period of time to (ii) the total number of frames received during the same period of time. This ratio, computed by the AT on the forward link and by the base station on the reverse link, is called the frame error rate (FER). The FER is an indicator of the RF conditions of the forward and/or reverse link, and consequently the quality service provided over the respective link. For instance, frame errors may manifest as lost audio samples, which in turn cause choppy or distorted audio output when played out by a receiving device. Similarly, frame errors may represent packet-data loss that results in retransmissions and lower overall throughput. In general, the higher the FER, the lower the quality of service will be, and vice versa. For a given set of physical conditions underlying communications between a base station and an access terminal, the higher the transmission power on the link (forward or reverse), the lower the FER will be. Consequently, the quality of service provided on a link can be adjusted and/or controlled by adjusting the transmission power used on the link.

In order to support concurrent communication in multiple channels on a common frequency, each channel is allocated a fraction of the total forward-link power available in the sector. The power allocated to each channel is determined so as to optimize the signal-to-noise characteristics of all the channels, and may vary with time according to the number of access terminals being serviced, and their relative positions with respect to the BTS, among other factors. Similarly, on the reverse links, each access terminal transmits at a power level that optimizes the signal-to-noise while minimizing interference with other access terminals.

In practice, similar methods of power control are implemented on both the forward and reverse links. For each link, two interrelated schemes are employed. The first, called "inner-loop" power control, achieves rapid convergence of link power to a level corresponding to a threshold signal-to-noise ratio (SNR). The second, called "outer-loop" power control, operates on a much longer time scale (i.e., more slowly) than the inner loop, and adjusts the inner-loop threshold SNR in response to the computed FER. Thus the outer loop adjusts the SNR threshold to attain a desired quality of service (as measured by FER), while the inner loop adjusts the link power to quickly achieve (at least approximately) the SNR threshold set by the outer loop. Since the protocols are similar for both the forward and reverse links, it sufficient for the present purposes to describe the details of power control with reference only the reverse link. However, it should be understood that, except for switching operational roles of an access terminal and a base station (i.e., roles with respect to sending and responding to power-control commands described below), the basic principles apply to the forward link as well.

More specifically, for inner-loop power control, the base station measures (for each reverse link) SNR at a rate of 800 times per second (although other rates are possible), each SNR measurement being made in terms of $E_b/N_0$, where $E_b$ is the energy per bit of the signal received by the AT and the $N_0$ is the noise power spectral density. For each measurement, the base station compares $E_b/N_0$ with a threshold value called $(E_b/N_0)_{setpoint}$ and responsively sets and sends a power control bit to the AT in order to affect a power adjustment. In practice, power adjustment is applied in terms of gain relative to a current power level, and measured in dB. For $E_b/N_0 \leqq (E_b/N_0)_{setpoint}$, the base station sets the power control bit to "power up," and, in conventional operation, the AT responsively increases the reverse link gain by a small amount (typically 1 dB or less). For $E_b/N_0 > (E_b/N_0)_{setpoint}$, the base station sets the power control bit to "power down," and, in conventional operation, the AT responsively decreases the reverse link gain by the same small amount. In this manner, the reverse link power rapidly converges, in small increments or decrements, to a level where $E_b/N_0 \approx (E_b/N_0)_{setpoint}$, and thereafter fluctuates about $(E_b/N_0)_{setpoint}$ until $(E_b/N_0)_{setpoint}$ is adjusted to a new value by outer-loop power control, or operating conditions change such that $E_b/N_0$ diverges from $(E_b/N_0)_{setpoint}$. Each transmission by the base station of the power control bit set to power up is commonly referred to as a "power-up command." Similarly, each transmission of the power control bit set to power down is referred to as a "power-down command." Power-up commands are specific examples of the more generically-termed power-increment commands described above, and power-down commands are specific examples of the more generically-termed power-decrement commands described above.

For outer-loop power control on the reverse link, the base station computes the FER in consecutive windows, each being an integer number of frames in duration. Thus, in each window, FER may be expressed as the number of frames with errors divided by the number of frames per window. Typically, the duration of a window is 20 frames, although other window sizes (number of frames per window) could be used. For each window, the base station compares the computed FER with a reverse-link Target FER (TFER). If the computed FER is less than TFER, the base station decreases $(E_b/N_0)_{setpoint}$. Conversely, if the computed FER is greater than TFER, the base station increases $(E_b/N_0)_{setpoint}$. In this manner, a computed FER that exceeds the target FER drives the inner-loop power control to increase the reverse-link power, while a computed FER that is below the target FER drives the inner-loop power control to decrease the reverse-link power.

In the context of a CDMA family of protocols, the power control methods described in the preceding are sometimes referred to as "inner-loop power-control protocols" and "outer-loop power-control protocols." It should also be noted that additional or alternative methods of power control may be applied to either of the forward or reverse links.

With arrangement described above, an access terminal can engage in cellular voice or packet-data communications. Referring again to FIG. 3, and taking an originating call from AT 302 as an example, AT 302 first sends an origination request over air interface 303 and via the BTS 304 and BSC 306 to MSC 308. The MSC then signals back to the BSC directing the BSC to assign an air interface traffic channel for use by the access terminal. For a voice call, the MSC uses well-known circuit protocols to signal call setup and establish a circuit connection to a destination switch that can then connect the call to a called device (e.g., landline phone or another access terminal). For a packet-data session, the BSC signals to the PDSN 316 by way of PCF 314. The PDSN 316 and access terminal 302 then negotiate to establish a data link layer connection, such as a point to point protocol (PPP) session. Further, the PDSN 316 sends a foreign agent advertisement that includes a challenge value to the access terminal, and the access terminal responds with a mobile-IP registration request (MIP RRQ), including a response to the challenge, which the PDSN forwards to HA 322. The HA then assigns an IP address for the access terminal to use, and the PDSN passes that IP address via the BSC to the access terminal.

2. High Rate Packet-Data Communications

Under IS-2000, the highest rate of packet-data communications theoretically available on a fundamental traffic channel of the forward link is 9.6 kbps, dependent in part on the power allocated to the forward-link traffic channel and the resultant signal-to-noise characteristics. In order to provide higher rate packet-data service to support higher bandwidth applications, the industry introduced a new "high rate packet data (HRPD) system," which is defined by industry standard IS-856.

IS-856 leverages the asymmetric characteristics of most IP traffic, in which the forward link typically carries a higher load than the reverse link. Under IS-856, each access terminal maintains and manages an active set as described above, but receives forward-link transmission from only one active sector at a time. In turn, each sector transmits to all its active ATs on a common forward link using time division multiplexing (TDM) in order to transmit to only one access terminal at a time, but at the full power of the sector. As a result of the full-power allocation by the sector, an access terminal operating under IS-856 can, in theory, receive packet-data at a rate of at least 38.4 kbps and up to 2.4 Mbps on its forward link.

The reverse link under IS-856 retains largely the traditional IS-2000 code division multiplexing (CDM) format, albeit with the addition of a "data rate control" (DRC) channel used to indicate the supportable data rate and best serving sector for the forward link. Multiple, active ATs in a common serving sector can transmit concurrently on their respective reverse links to the sector's BTS. Each reverse link comprises distinct code channels, thereby enabling the BTS to distinguish among each AT's transmissions. As with IS-2000, the IS-856 reverse link transmissions are frame-based.

TDM access on the IS-856 forward link is achieved by dividing the forward link in the time domain into time slots of length 2048 chips each. At a chip rate of 1.228 Mega-chips per second, each slot has a duration of 1.67 milliseconds (ms). Each time slot is further divided into two 1024-chip half-slots, each half-slot arranged to carry a 96-chip pilot "burst" (pilot channel) at its center and a Medium Access Control (MAC) channel in two 64-chip segments, one on each side of the pilot burst. The remaining 1600 chips of each time slot (800 per half-slot) are allocated for a forward traffic channel or a forward control channel, so that any given time slot will carry either traffic-channel data (if any exists) or control-channel data. Traffic-channel data comprise user application data, while control-channel data comprise IS-856 control messages. As in IS-2000, each sector in IS-856 is defined by a PN offset, and the pilot channel carries an indication of the sector's PN offset. Also as in IS-2000, an access terminal operating under IS-856 monitors the pilot signal emitted by various sectors in order to facilitate active set management, i.e., as a basis to facilitate handoff from one sector to another.

Unlike the IS-856 forward link which is allocated the full power of the serving sector (or other coverage area) to each AT on a TDM basis, the power applied to the reverse link from each of possibly multiple ATs in a common serving sector is individually controlled by the base station using the same methods described above for IS-2000. In particular, for each active AT in a sector, the serving base station uses a calculated frame error rate to set an outer-loop SNR threshold (i.e., the $(E_b/N_0)_{setpoint}$) and, in accordance with inner-loop power control protocols, issues appropriate power-control commands—power-up or power-down commands—to cause the $E_b/N_0$ of the signal received from the AT to converge to the threshold.

Operation in an IS-856 compliant communication system may be illustrated, again with reference to FIG. 3. To acquire packet data connectivity under IS-856, after an access terminal first detects an IS-856 carrier, the access terminal sends to its BSC (or RNC) 306 a UATI (Universal Access Terminal Identifier) request, and receives in response an UATI, which the access terminal can then use to identify itself in subsequent communications with the BSC. The access terminal then sends a connection-request to the BSC 306, and the BSC responsively invokes a process to authenticate the access terminal and to have the access terminal acquire a data link.

In particular, the BSC 306 sends an access request to an Access Network AAA (ANAAA) server (which may be different than the AAA server 320), and the ANAAA server authenticates the access terminal. The BSC 306 then assigns radio resources for the data session, providing a MAC identifier ("MAC ID") to the AT for identifying its time-slot data sent in the forward-link traffic channel, and a Walsh code for a sending data on the reverse-link traffic channel. Further, the BSC signals to the PDSN 316 (via PCF 314), and the PDSN and access terminal then negotiate to establish a PPP data link. In addition, as in the IS-2000 process, the access terminal then sends an MIP RRQ to the PDSN, which the PDSN forwards to the HA 322, and the HA assigns a mobile-IP address for the access terminal to use.

Once the access terminal has acquired an IS-856 radio link, a data link, and an IP address, the access terminal is considered to be in an active mode. In active mode, the AT receives its data distributed across MAC-identified time slots transmitted by the BTS using the full power of the forward link of the sector selected by the AT (as described above). Thus, the access terminal recognizes its time-slot data from among other time slots by a MAC identifier included in each transmission, and processes only those time slots with the AT's assigned MAC identifier. Using the full power of the forward link maximizes the signal-to-noise ratio, thus facilitating higher rate data communication than the power-limited conventional CDMA channels.

3. Intelligent Power Control a. Operating Principles

Figure 4:
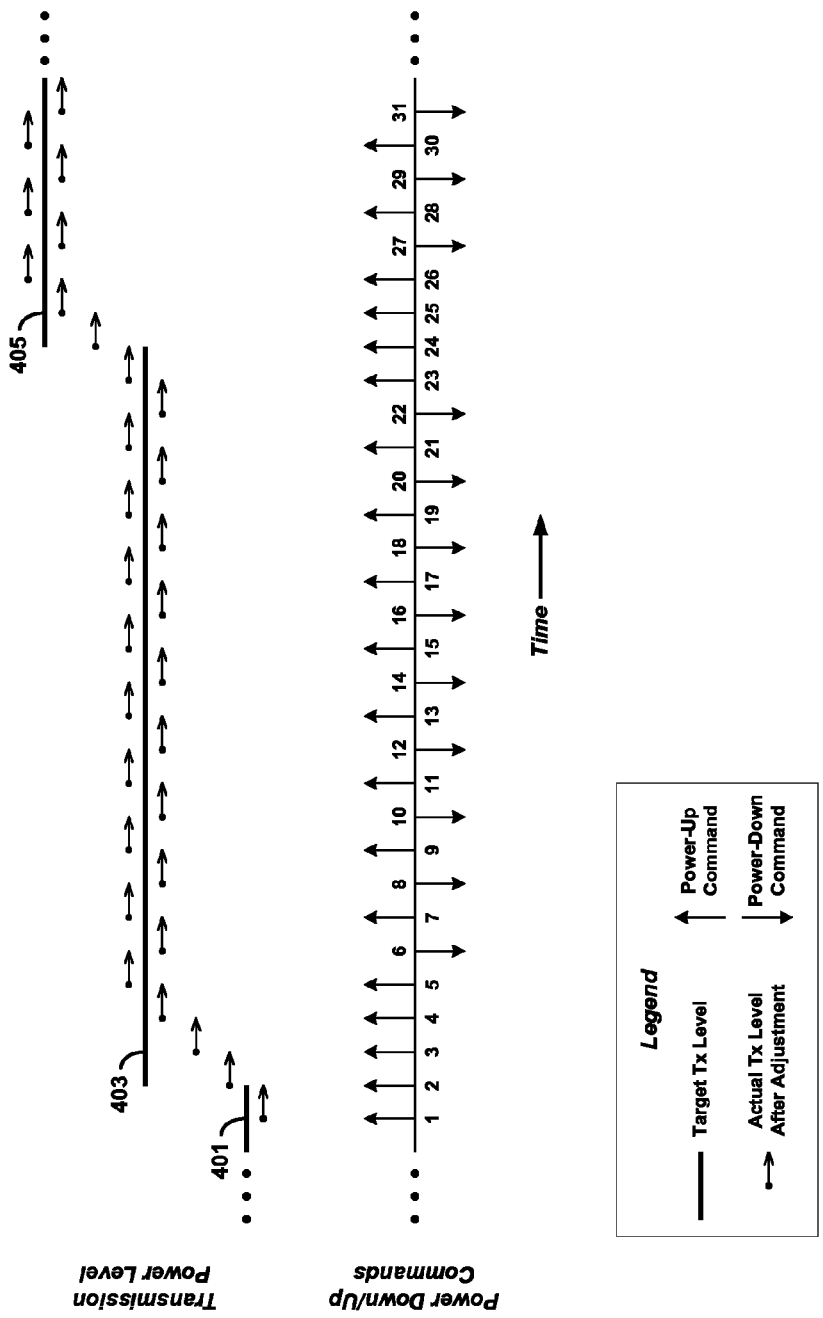
FIG. 4 illustrates an example of conventional power control in terms of sequences of power-control commands.

FIG. 4 illustrates conventional operation of power control as a function of time for example sequences of power-up and power-down commands that achieve and maintain target transmission power levels. Example target transmission levels as well as example "actual" transmission power levels resulting from power adjustments are shown in a top panel of FIG. 4. The power-control commands received by the sending entity are shown in a bottom panel of FIG. 4. As indicated, time increases towards the right in the figure. For the purpose of describing the process from the point of view of the sending entity, the target transmission power levels shown in FIG. 4 are taken to correspond to transmission power levels on the sending entity's air interface that are needed achieve the required threshold level at the receiving entity, and are not the received power at the receiving entity. Note, however, that in practice the sending entity does not know what the target level is, only that it needs to adjust its transmission power level up or down in accordance with each received power-control command. As with the discussion of FIG. 1, the sending entity could be an access terminal and the receiving entity a base station, or vice versa.

As indicated in the Legend in FIG. 4, the target transmission power levels in the top panel are represented by thick horizontal lines ("Target Tx Level" in the Legend). Also as indicated in the Legend, power-up commands are represented by upward-directed arrows, while power-down commands are represented by downward-directed arrows. A number below each power-up command and above each power-down command in the bottom panel corresponds to the order of arrival of the command at the sending entity, and provides a label for the convenience of the discussion herein. The time position of each command in the bottom panel represents the arrival time at the sending entity. The actual transmission power levels after the sending entity increases or decreases the transmission power level in response to a received power-control command are represented in the top panel by the short, rightward-directed, horizontal arrows ("Actual Tx Level After Adjustment" in the Legend). The dot at the left each arrow is time-aligned with the particular power-control command that caused the sending entity to make the adjustment. By way of example, the adjustment made in response to each power-up command is taken to be 1 dB up, and the adjustment made in response to each power-down command is taken to be 1 dB down. However, other amounts of adjustment could be made in response to the commands.

Three example target transmission power levels, target Tx level 401, 403, and 405, are depicted in FIG. 4. As noted, each is to a transmission power level that needs to be achieved by the sending entity in order to satisfy the threshold level at the receiving entity. As such, they depict evidently to discontinuous jumps in the received-power requirements at the receiving entity. There can be at least two reasons for such discontinuous jumps. The first reason is a change in the threshold level at the receiving entity, as determined according to the outer-loop control protocols described above. The second reason is a sudden change in operating conditions of the sending entity, the receiving entity, or both. For example, if the receiving entity is an access terminal that suddenly enters a zone of poor coverage (or suffers fading effects), the power it receives on its forward link could suddenly drop. The access terminal would correspondingly require a sudden increase in received power. Either or both of these reasons (as well as possibly others) could apply to the example illustrated in FIG. 4.

At the initial time represented in FIG. 4, the target Tx level 401 is in effect. As indicated, response to power-up command #1 results in an actual Tx level that is evidently below the target. Response to power-up command #2 then results an actual Tx level that is above the target. The target level then evidently jumps to target Tx level 403. Power-up commands #3-5 then bring the actual Tx level just above the new target level (403). Target Tx level 403 persists to approximately power-control command #23, and then jumps to target Tx level 405. Between power-control commands #5 and #23, the actual Tx level is stable with respect to the target level. However, the stability is maintained through a sequence of alternating power-up and power-down commands. That is, since power-up command #5 results an actual Tx level above the target, the receiving entity next sends a power-down command (#6). In response, the sending entity decreases its actual Tx level to just below the target, so the sending entity next sends a power-up command (#7), and so on until the target level jumps to target Tx level 405. Consecutive power-up commands #23-26 then achieve the new target, and stable operation again ensues for power-control commands #27-31 and possibly beyond (as indicated by the ellipses).

The 18 alternating power-up and power-down commands (#5-23) that maintain steady power about target Tx level 403 do so by causing the sending entity to alternatingly increase and decrease the transmission power on its air interface. This "flip-flop" of transmission power can be an inefficient and unnecessary cycling of transmission power levels when the target level is otherwise constant for an extended period of time. In accordance with an example embodiment of intelligent power control, the sending entity advantageously recognizes such extended periods of constant target power levels through tracking the number of alternating power-up and power-down commands received, and then advantageously ceases to respond to further power-control commands until it recognizes that the target power level has changed. The sending entity then begins responding again to power control commands.

b. Example Operation

Figure 5:
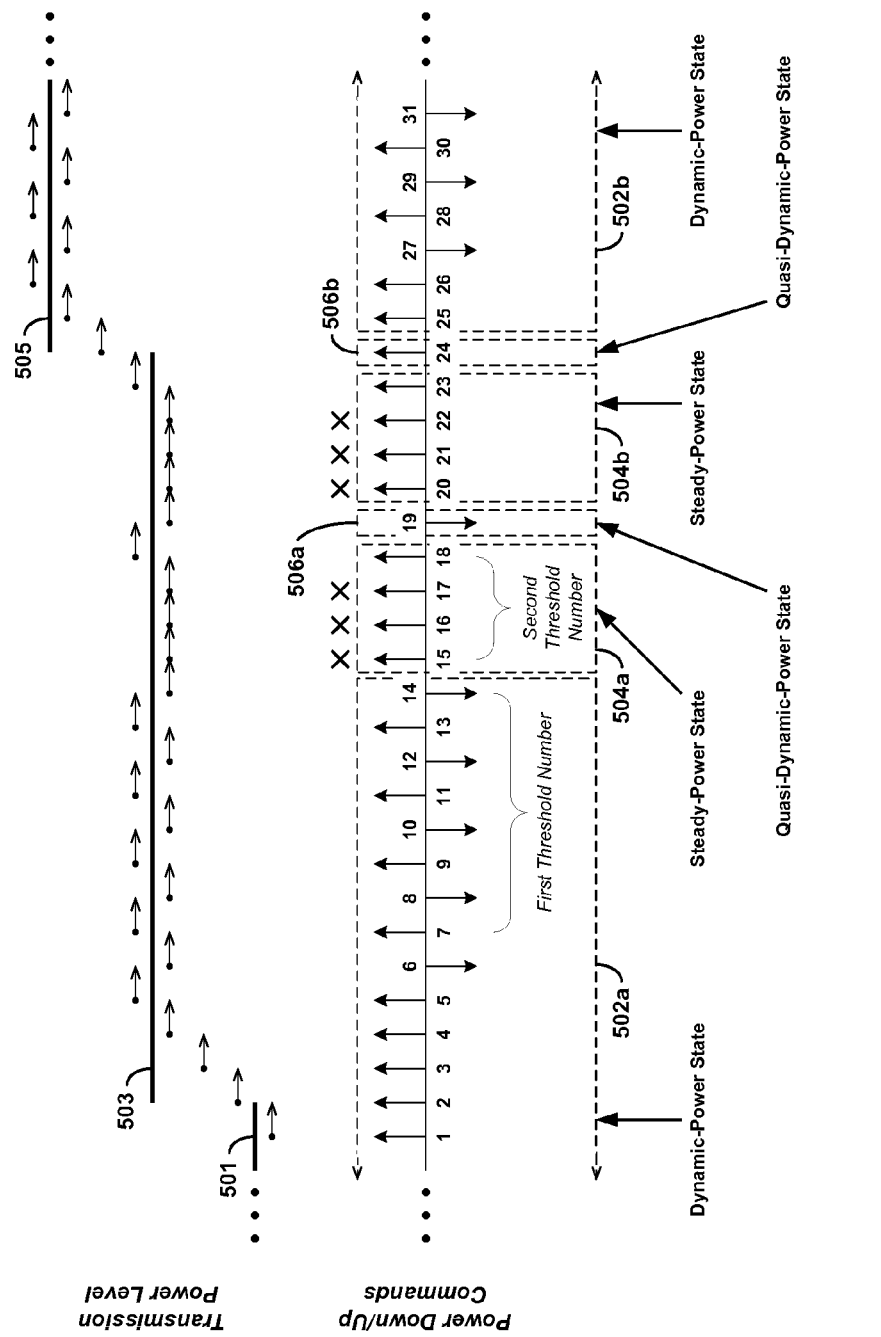
FIG. 5 illustrates an example of operation of intelligent power control in terms of sequences of power-control commands.

FIG. 5 illustrates the operating principles of intelligent power control by way of example operation of a sending entity in response to example sequences of power-control commands. The format and the meaning of the symbols shown in FIG. 5 are the same as those used in FIG. 4. Operation of the sending entity is explained in terms of the three operating states described in connection with FIG. 2. The example target transmission power levels are also the same as those shown in FIG. 4, but relabeled as target Tx levels 501, 503, and 505.

The sending entity is initially operating in dynamic-power state 502a, depicted by the open-ended dashed rectangle (open side at the left side indicates that the state may have persisted prior to the initial time in FIG. 5). While operating in dynamic-power state 502a, the sending entity receives power-control commands #1-14, which are the same as those for FIG. 4, and to which the sending entity responds as described in FIG. 4. Operation of the sending entity in the dynamic-power state is largely the same as that for conventional operation, except that the sending entity keeps track of the sequences of received power-control commands. Specifically, the sending entity can recognize when it receives a first threshold number of alternating power-up and power-down commands. By way of example, the first threshold number is taken to be eight, and the corresponding sequence is power-control commands #7-14. Other numbers could be used for the first threshold; furthermore, the first threshold number could be counted in terms of pairs of alternating power-control commands (e.g., four pairs in the present illustration).

Upon receiving the first threshold number of alternating power-control commands, the sending entity transitions to the steady-power state 504a, depicted by the next (in time) dashed rectangle. In this state, the sending entity does not adjust transmission power on its air interface in response to received power-control commands until it receives a particular sequence of commands. Specifically, upon receiving a second sequence of a second threshold number of consecutive commands that are each of a type opposite that of the "last" command received in the dynamic-power state, the sending entity responds to the last command of the second sequence, and then transitions to the quasi-dynamic-power state 506a (next dashed rectangle rightward).

By way of example, the "last" command received in the dynamic-power state (#14) is a power-down command, and the second threshold number is taken to be four. As indicated by the "X" above each of the first three power-up commands (#15-17) received while in the steady-power state, the sending entity remains at the power level last adjusted according to power-control command #14. The sending entity then responds to the fourth of the four power-up commands (#18) by incrementing the its transmission power and then transitioning to quasi-dynamic-power state 506a. Advantageously, the sending entity has avoided adjusting the transmission power on its air interface for three of the four power-control received during the steady state.

While in the quasi-dynamic-power state, the sending entity waits for just one power-control command to determine whether to transition back to the steady-power state or to the dynamic-power state. In the present example, the next power-control command is a power-down command (#19), indicating that the response to power-up command #18 was sufficient to achieve the threshold level (as shown by the actual Tx power level achieved in response to power-up command #18), thus indicating the target level has not changed. Consequently, the sending entity transitions to steady-power state 504b (next dashed rectangle rightward). Advantageously, this transition to the steady-power state does not require the first threshold number of alternating power-control commands, but just one, thereby avoiding a transition to the dynamic state when a steady target level still holds.

The example sequence of power-control commands shown during steady-power state 504b is the same as that for steady-power state 504a. Consequently, the sending entity operates in the same way as in state 504a, transitioning to quasi-dynamic-power state 506b (next dashed rectangle rightward) after incrementing transmission power in response to power-up command #23. However, in the present example operation, the target level evidently jumps from target Tx level 503 to target Tx level 505 somewhere between power-up commands #23 and #24. As a result, the actual Tx power level is below the target level even after the increment in response to power-up command #23. Thus, the one power-control command received during operation in quasi-dynamic-power state 506b is an additional power-up command (#24). In this instance, the sending entity advantageously recognizes that the target level has shifted upward, and responds by transitioning to the dynamic-power state 502b.

The sending entity remains in dynamic-power state 502b at least until the target Tx level 505 is achieved, which evidently occurs by power-up command #26 in the present example. The dashed rectangle representing dynamic-power state 502b is open toward the right, indicating that this state may persist beyond the last power-control command (#31). If the first threshold number of alternating commands should again be received during this state, the sending entity will again transition the steady-power state.

The operation illustrated in FIG. 5 does not show every possible combination of received power-control commands and state transitions. However, the example may be generalized to cover operation of the sending entity under other conditions of target Tx levels and other sequences of power-control commands. First, it may be noted that the first threshold number used to determine when to transition from the dynamic-power state to the steady-power state could be other than the value (eight) used in this example. In particular, a smaller number will cause a transition to occur sooner than a larger number, but a larger number might provide a more reliable indicator of when the target Tx level is on a long-term trend of near constancy. Similarly, the second threshold number could be other than the value (four) used in this example. A larger number will increase the duration of advantageous operation in the steady-power state, but may also cause the sending entity to delay responding to actual changes in the target Tx level.

Second, in an alternative or additional embodiment, the tally of alternating power control commands could associate the last command of the first threshold number with a power-down command, instead of a power-up command in the present example. This embodiment would accommodate downward movement of the target Tx levels during quasi-dynamic-power states. In this case, the explanation above would still apply, provided the types of commands received during the steady-power states and quasi-dynamic power states are replaced (by way of example) by the opposites of those in the example and the target Tx level 505 is below target Tx level 503.

Finally, the example in FIG. 5 omits the possibility that the first power-control command received during the steady-power state is of the same type as the last one during the immediately preceding dynamic-power state. In this case, the sending entity would recognize that the target Tx level just happened to change after the first threshold number of alternating power-control commands had been received, and by the time the sending entity transitioned to the steady-power state. Thus, the sending entity will transition back to the dynamic-power state in this instance.

4. Implementation of Example Embodiment

The example embodiment of intelligent power control described above can be implemented as a method in a sending entity, such as an access terminal in or a base station that is part of a wireless communication system that operates according to a CDMA family of protocols, such as the one described above in connection with FIG. 3. The logical steps and operations of the method are described in the next subsection. Example means for carrying out the method in an access terminal and in a base station are described in the subsequent subsections.

a. Example Method

Figure 6:
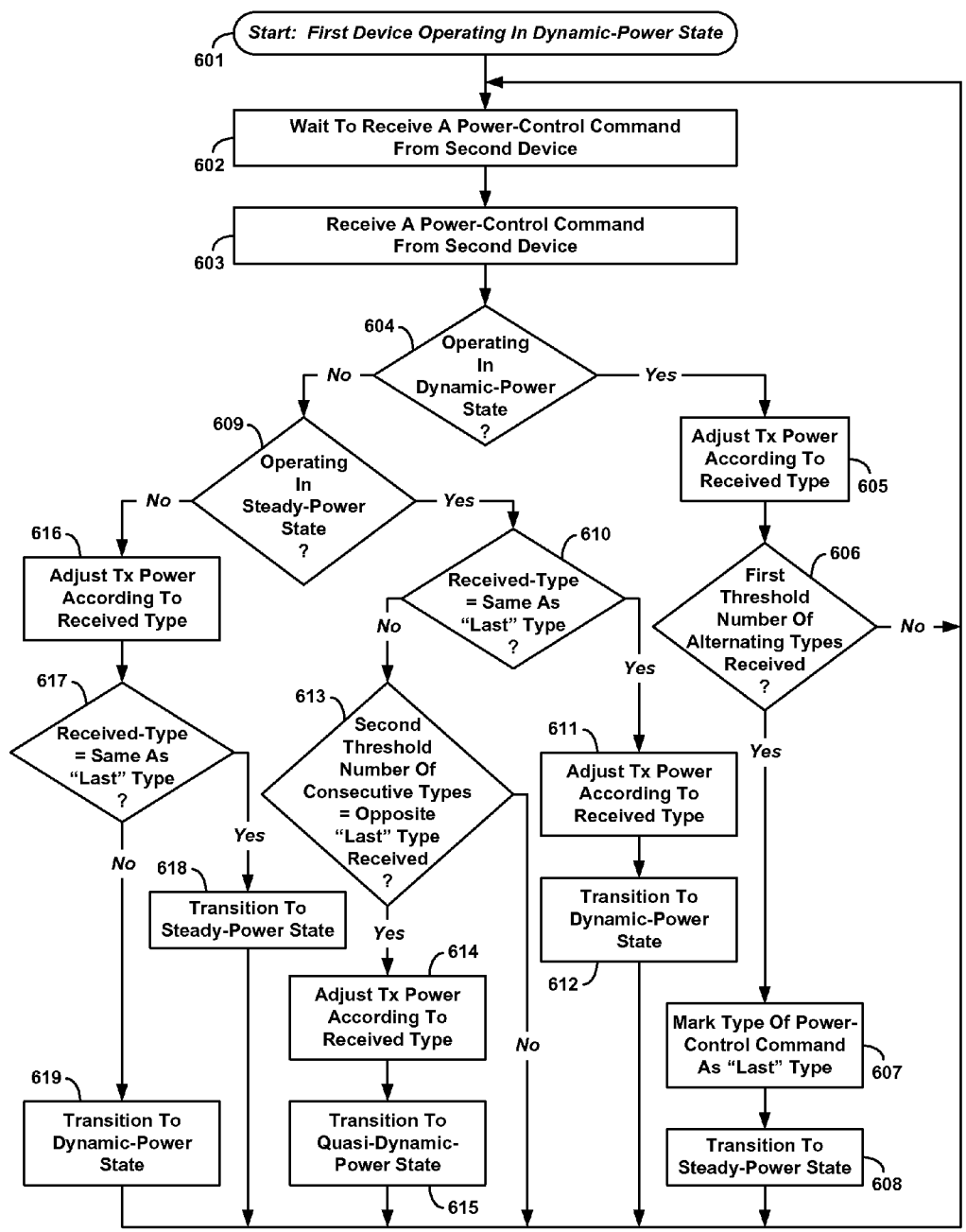
FIG. 6 illustrates an example set of logical process steps for implementing an example embodiment of intelligent power control.

FIG. 6 depicts an example method of intelligent power control in the form of a logical flowchart. The steps could be implemented as software, firmware, and/or hardware instructions stored in physical memory of a suitable sending entity, and executed by one or more general purpose and/or special purpose processors. In FIG. 6, the sending entity is referred to as the first device and the receiving entity is referred to as the second device, wherein the first device receives power-control commands from the second device.

In practice, each power-control command is one of two opposite types. That is, a power-up (or more generally, power-increment) command is the opposite type from a power-down (or more generally, power-decrement) command, and vice versa. Moreover, in accordance with the example operation discussed above, the behavior of the sending entity can be described in terms of the relative types of received power-control commands. Therefore, in the description of the method illustrated in FIG. 6, different power-control commands are compared to each other either as being "same types" or "opposite types," and without specific reference to specific types (e.g., power-up or power-down). Similarly, adjustments of the transmission power of the sending entity's air interface in response to power-control commands are referred to as being taken in accordance with the types of power control commands.

At the start 601 of the intelligent power-control method in FIG. 6, the first device is, by way of example, operating in the dynamic-power state, in which the first device responds to each received power-control command in accordance with the type of each command, as explained above. After responding to a given power-control command, the first device waits (step 602) to receive a next power-control command from the second device, and at step 603, the first device receives a power-control command from the second device.

The first device's response to the received command depends on its current operating state. At step 604, the first device determines whether or not it is operating in the dynamic-power state. For instance, the first device may maintain a status value in its memory that indicates its current operating state. If the first device is operating in the dynamic-power state ("Yes" branch from step 604), then the first device adjusts its Tx power level (step 605) according to the type of power control command received at step 602. Then at step 606, the first device determines whether or not it has received the first threshold number of alternating types of power-control commands, wherein the power-control command received at step 602 is included in the determination. For example, the first device can keep track in its physical memory of the types of received power-control commands in order to be able to identify a first sequence of a first threshold number of alternating commands.

If the first threshold number has not been received ("No" branch from step 606), then the first device returns to step 602, again waiting for a next power-control command. If the first threshold number has been received ("Yes" branch from step 606), then the first device takes note (step 607) of the type of the power-control command received at step 602. For instance, the type may be recorded in the physical memory of the first device. For the convenience of the present discussion, the type is labeled as the "Last" type, where "Last" refers the last of the sequence of alternating power-control commands. The first device then transitions to the steady-power state (step 608), and returns to step 602 to wait for a next power-control command. In this case, the first device has advantageously recognized that the target Tx level is constant, and therefore the device should operate in the steady-power state. In transitioning to the steady-power state, the first device may change a status indicator that it uses when determining its current state.

If the determination at step 604 is that the first device is not operating in the dynamic-power state ("No" branch from step 604), the first device then determines at step 609 whether or not it operating in the steady-power state. Again, a memory-stored status indicator may be consulted to make this determination. If the first device is operating in the steady-power state ("Yes" branch from step 609), the first device then determines at step 610 whether or not the type of the power-control command received at step 602 is the same as the "Last" type. If the received-type is the same as the "Last" type ("Yes" branch from step 610), the first device adjusts its Tx power level (step 611) according to the type of power control command received at step 602, transitions (step 612) back to the dynamic-power state, and then returns to step 602 to wait for a next power-control command.

If the received-type is not the same as the "Last" type ("Yes" branch from step 610), then the first device determines at step 613 whether or not the second threshold number of consecutive types opposite that of the "Last" type has been received, wherein the determination includes the type of the power-control command received at the most recent traversal of step 602. As with the test of the first threshold number (step 606), the first device can keep track in its physical memory of the types of received power-control command in order to be able to identify a second sequence of a second threshold number of consecutive commands that are opposite the "Last" type. If the second threshold number has not been received ("No" branch from step 613), then the first device returns to step 602 to wait for a next power-control command. Note that in this case, the first device makes no Tx power adjustment in response to the power-control command received at the most recent traversal of step 602, thus advantageously avoiding power flip-flops when the target Tx level is constant.

If the second threshold number has been received, ("Yes" branch from step 613), the first device adjusts its Tx power level (step 614) according to the type of power control command received at step 602, transitions (step 615) to the quasi-dynamic-power state, and then returns to step 602 to wait for a next power-control command.

If the determination at step 609 is that the first device is not operating in steady-power state ("No" branch from step 109), then in accordance with there being three states, the first device must be operating in the quasi-dynamic-power state. In this case, the first device adjusts its Tx power level (step 616) according to the type of power control command received at step 602, and then determines at step 617 whether or not the type of the power-control command received at step 602 is the same as the "Last" type. If the received-type is the same as the "Last" type ("Yes" branch from step 617), the first device transitions (step 618) to the steady-power state, and then returns to step 602 to wait for a next power-control command. If the received-type is not the same as the "Last" type ("No" branch from step 617), the first device transitions (step 619) to the dynamic-power state, and then returns to step 602 to wait for a next power-control command.

It will be appreciated that the steps shown in FIG. 6 is meant to illustrate operation of an example embodiment. As such, various steps could be altered or modified, and the ordering of certain steps could be changed, while still achieving the overall desired operation. In addition, it should be noted that if the sending entity is a base station (or BTS), the method illustrated in FIG. 6 would, in practice, be carried out separately for each access terminal (receiving entity, in this case) that sends power-control commands to the base station.

b. Example Access Terminal

Figure 7:
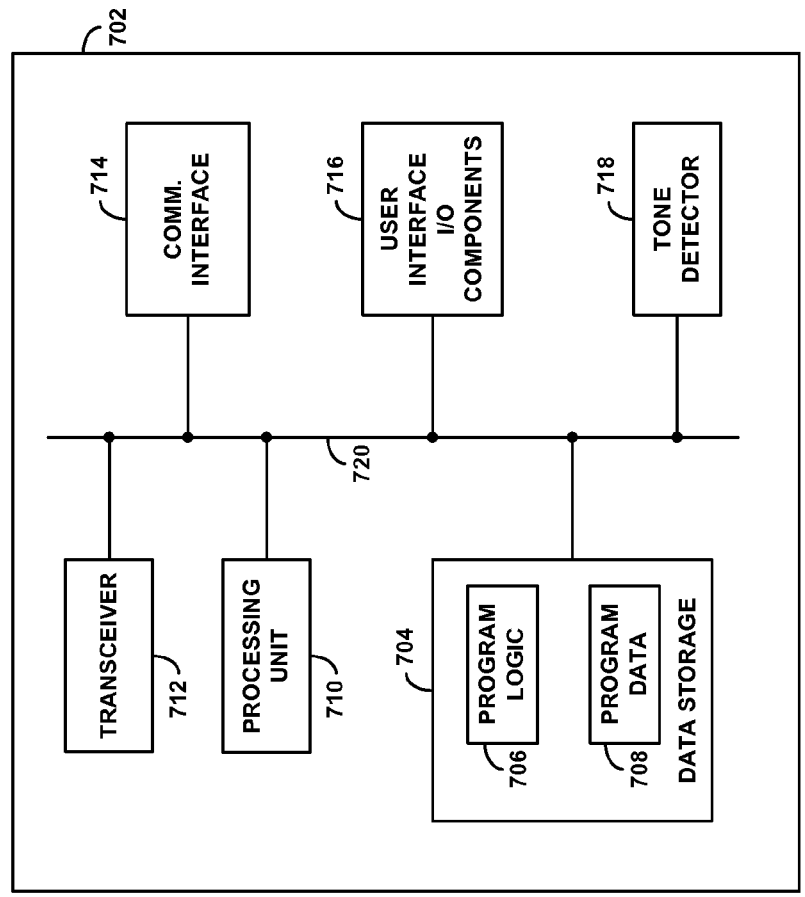
FIG. 7 is a block diagram of an example access terminal in which intelligent power control could be implemented.

FIG. 7 is a simplified block diagram depicting functional components of an example access terminal 702 in which intelligent power control may be implemented. The example AT 702 could be a cell phone, a personal digital assistant (PDA), a pager, a wired or wirelessly-equipped notebook computer, or any other sort of device. As shown in FIG. 7, the example AT 702 includes data storage 704, processing unit 710, transceiver 712, communication interface 714, user-interface I/O components 716, and tone detector 718, all of which may be coupled together by a system bus 720 or other mechanism.

These components may be arranged to support conventional operation in a wireless communication network that is compliant with a CDMA family of protocols, such as network 300 illustrated in FIG. 3. The details of such an arrangement and how these components function to provide conventional operation are well-known in the art, and are not described further herein. Certain aspects of AT 702 relevant to intelligent power control are discussed briefly below.

Communication interface 714 in combination with transceiver 712, which may include one or more antennas, enables communication with the network, including reception of power-control commands on the AT's forward link from a serving base station (or BTS) and transmission on the AT's reverse link. The communication interface may include a module, such as an MSM™-series chipset made by Qualcomm Inc. of San Diego, Calif., and supports wireless packet-data communications according to a CDMA family of protocols.

Processing unit 710 comprises one or more general-purpose processors (e.g., INTEL microprocessors) and/or one or more special-purpose processors (e.g., dedicated digital signal processor, application specific integrated circuit, etc.). In turn, the data storage 704 comprises one or more volatile and/or non-volatile storage components, such as magnetic or optical memory or disk storage. Data storage 704 can be integrated in whole or in part with processing unit 710, as cache memory or registers for instance. In example AT 702, as shown, data storage 704 is configured to hold both program logic 706 and program data 708.

Program logic 706 may comprise machine language instructions that define routines executable by processing unit 710 to carry out various functions described herein. In particular the program logic, communication interface, and transceiver may operate cooperatively to carry out logical operation such as that discussed above and illustrated in FIG. 6. Further, program data 708 may be arranged to store one or more tallies of power-control commands maintained in conjunction with the logical operations described above.

It will be appreciated that there can be numerous specific implementations of intelligent power control in an access terminal, such AT 702 illustrated in FIG. 7. Further, one of skill in the art would understand how to devise and build such an implementation. As such, AT 702 is representative of means for carrying out the method of intelligent power control in accordance with the methods and steps described herein by way of example.

c. Example Base Station

Figure 8:
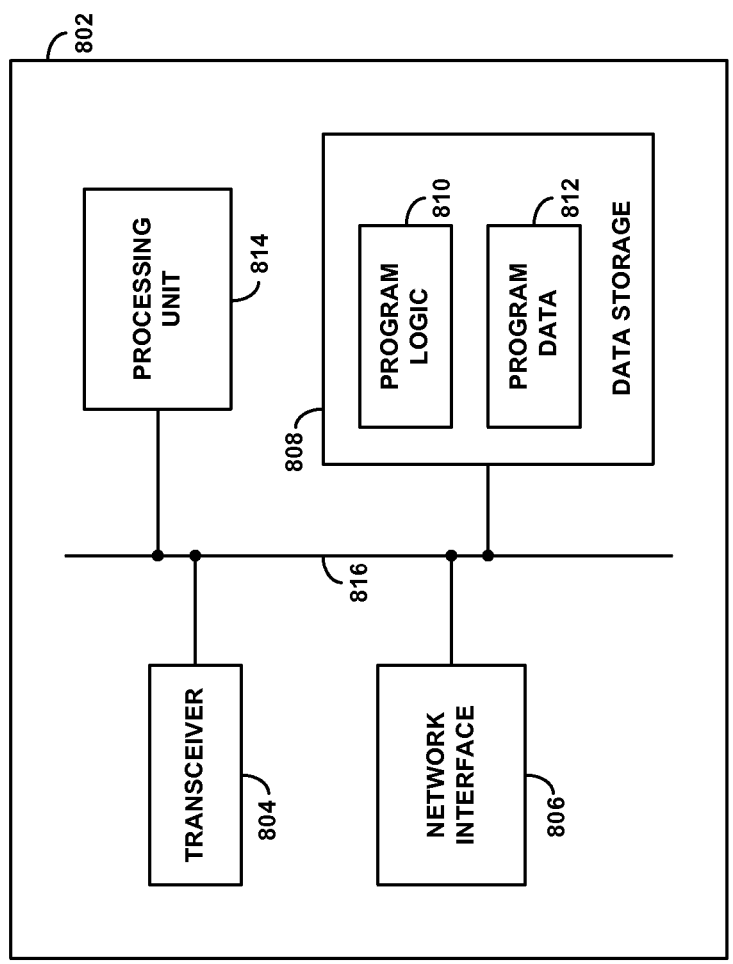
FIG. 8 is a block diagram of an example base station in which intelligent power control could be implemented.

FIG. 8 is a simplified block diagram depicting functional components of an example base station (or BTS) 802 in which intelligent power control may be implemented. As shown in FIG. 8, the example base station 802, representative of BTS 304 or BSC 306 integrated with BTS 304 FIG. 3, for instance, includes a transceiver 804, network interface 806, a processing unit 814, and data storage 808, all of which may be coupled together by a system bus 816 or other mechanism. In addition, the base station may also include external storage, such as magnetic or optical disk storage, although this is not shown in FIG. 8.

These components may be arranged to support conventional operation in a wireless communication network that is compliant with a CDMA family of protocols, such as network 300 illustrated in FIG. 3. The details of such an arrangement and how these components function to provide conventional operation are well-known in the art, and are not described further herein. Certain aspects of base station 802 relevant to intelligent power control are discussed briefly below.

Network interface 806 enables communication on a network, such network 300. As such, network interface 806 may take the form of trunk or optical link that can be coupled with a TDM switch such as MSC 308, or an Ethernet network interface card or other physical connection that can be coupled with PCF 314, for instance. Further, network interface 806 in combination with transceiver 804, which may include one or more BTS antennas, enables air interface communication one or more access terminals, supporting reception of power-control commands on the ATs' reverse links.

Processing unit 814 comprises one or more general-purpose processors (e.g., INTEL microprocessors) and/or one or more special-purpose processors (e.g., dedicated digital signal processor, application specific integrated circuit, etc.). In turn, the data storage 808 comprises one or more volatile and/or non-volatile storage components, such as magnetic or optical memory or disk storage. Data storage 800 can be integrated in whole or in part with processing unit 814, as cache memory or registers for instance. As further shown, data storage 808 is equipped to hold program logic 810 and program data 812.

Program logic 810 may comprise machine language instructions that define routines executable by processing unit 814 to carry out various functions described herein. In particular the program logic, communication interface, and transceiver may operate cooperatively to carry out logical operation such as that discussed above and illustrated in FIG. 6. Further, program data 812 may be arranged to store one or more tallies of power-control commands maintained in conjunction with the logical operations described above.

It will be appreciated that there can be numerous specific implementations of intelligent power control in an access terminal, such AT 802 illustrated in FIG. 8. Further, one of skill in the art would understand how to devise and build such an implementation. As such, AT 802 is representative of means for carrying out the method of intelligent power control in accordance with the methods and steps described herein by way of example.

5. CONCLUSION

An exemplary embodiment of the present invention has been described above. Those skilled in the art will understand, however, that changes and modifications may be made to this embodiment without departing from the true scope and spirit of the invention, which is defined by the claims.

We claim:

1. In a first device communicatively coupled with a second device via an air interface, a method comprising:
operating in a dynamic-power state in which the first device increases transmission power on the air interface by an incremental amount in response to each of one or more power-increment commands received from the second device and decreases transmission power on the air interface by a decremental amount in response to each of one or more power-decrement commands received from the second device;
while operating in the dynamic-power state, upon receiving a first sequence of a first threshold number of alternating power-increment and power-decrement commands from the second device, transitioning to operating in a steady-power state in which the first device makes no adjustment of transmission power on the air interface in response to receiving power-increment commands from the second device and makes no adjustment of transmission power on the air interface in response to receiving power-decrement commands from the second device;
while operating in the steady-power state, making a determination that a particular sequence of power-increment commands and power-decrement commands has been received from the second device; and
based at least on the determination, transitioning from operating in the steady-power state to operating in the dynamic-power state.

2. The method of claim 1, wherein the incremental amount is selected from the group consisting of a first absolute amount of transmission power, and a first fractional amount of a current transmission power level,
and wherein the decremental amount is selected from the group consisting of a second absolute amount of transmission power, and a second fractional amount of the current transmission power level.

3. The method of claim 1, wherein the first device is an access terminal operating in a wireless communication system, the second device is a base station that is part of the wireless communication system, and the air interface supports a forward link for communications from the base station to the access terminal and a reverse link for communications from the access terminal to the base station.

4. The method of claim 3, wherein the wireless communication system operates according to a CDMA family of protocols, each power-increment command received at the access terminal is a power-up command sent from the base station to the access terminal on the forward link according to an inner-loop power-control protocol, and each power-decrement command received at the access terminal is a power-down command sent from the base station to the access terminal on the forward link according to the inner-loop power-control protocol.

5. The method of claim 1, wherein the second device is an access terminal operating in a wireless communication system, the first device is a base station that is part of the wireless communication system, and the air interface supports a forward link for communications from the base station to the access terminal and a reverse link for communications from the access terminal to the base station.

6. The method of claim 5, wherein the wireless communication system operates according to a CDMA family of protocols, each power-increment command received at the base station is a power-up command sent from the access terminal to the base station on the reverse link according to an inner-loop power-control protocol, and each power-decrement command received at the base station is a power-down command sent from the access terminal to the base station on the reverse link according to the inner-loop power-control protocol.

7. The method of claim 1, wherein each power-increment command is one of a type of power-control command and each power-decrement command is another of a type of power-control command,
and wherein making the determination that a particular sequence of power-increment commands and power-decrement commands has been received from the second device comprises determining that a particular sequence of power-control commands has been received, the particular sequence of power-control commands being selected from the group consisting of a second threshold number of consecutive power-increment commands, and a third threshold number of consecutive power-decrement commands.

8. The method of claim 1, wherein each power-increment command is one of a type of power-control command and each power-decrement command is another of a type of power-control command,
and wherein making the determination that a particular sequence of power-increment commands and power-decrement commands has been received from the second device comprises determining that a particular sequence of power-control commands has been received from the second device, the particular sequence of power-control commands including both a second threshold number of power-increment commands and a third threshold number of power-decrement commands.

9. The method of claim 8, wherein determining that a particular sequence of power-control commands has been received from the second device comprises:
computing a net adjustment to transmission power of the first device on the air interface, the net adjustment corresponding to a sum of the second threshold number of power-increment commands and the third threshold number of power-decrement commands in the particular sequence of power-control commands, and the net adjustment being computed with respect to a current transmission power level, the current transmission power level being a transmission power level when the net adjustment is computed; and
determining that a sum of the net adjustment and the current transmission power level is outside of a range defined by a first threshold power level above the current transmission power level and a second threshold power level below the current transmission power level.

10. The method of claim 9, wherein computing the net adjustment to the transmission power of the first device on the air interface comprises computing a sum of a first number of power increments above the current transmission power level and a second number of power decrements below the current transmission power level, the first number being the second threshold number and the second number being the third threshold number.

11. The method of claim 1, wherein the received first sequence of the first threshold number of alternating power-increment and power-decrement commands ends with a power-decrement command,
wherein the particular sequence of power-increment commands and power-decrement commands is a sequence of a particular threshold number of consecutive power-increment commands that ends with a final power-increment command, and wherein, transitioning from operating in the steady-power state to operating in the dynamic-power state comprises:

increasing transmission power on the air interface by an incremental amount in response to receiving the final power-increment command of the particular sequence;

transitioning to operating in a quasi-dynamic-power state in which the first device waits to receive a power-control command; and while operating in the quasi-dynamic-power state, upon receiving from the second device a power-control command immediately subsequent to receiving the final power-increment command, increasing transmission power on the air interface by an incremental amount if the power-control command is a power-increment command, or decreasing transmission power on the air interface by an decremental amount if the power-control command is a power-decrement command, and transitioning to operating in (i) the steady-power state if the power-control command is a power-decrement command, or (ii) the dynamic-power state if the power-control command is a power-increment command.

12. The method of claim 1, wherein the received first sequence of the first threshold number of alternating power-increment and power-decrement commands ends with a power-increment command, wherein the particular sequence of power-increment commands and power-decrement commands is a sequence of a particular threshold number of consecutive power-decrement commands that ends with a final power-decrement command, and wherein, transitioning from operating in the steady-power state to operating in the dynamic-power state comprises:

decreasing transmission power on the air interface by an decremental amount in response to receiving the final power-decrement command of the particular sequence;

transitioning to operating in a quasi-dynamic-power state in which the first device waits to receive a power-control command; and while operating in the quasi-dynamic-power state, upon receiving from the second device a power-control command immediately subsequent to receiving the final power-decrement command, increasing transmission power on the air interface by an incremental amount if the power-control command is a power-increment command, or decreasing transmission power on the air interface by an decremental amount if the power-control command is a power-decrement command, and transitioning to operating in (i) the steady-power state if the power-control command is a power-increment command, or (ii) the dynamic-power state if the power-control command is a power-decrement command.

13. In a first device communicatively coupled with a second device via an air interface, a method comprising:

operating in a dynamic-power state in which the first device adjusts transmission power on the air interface in accordance with types of received power-control commands by increasing transmission power on the air interface by an incremental amount in response to each of one or more power-increment commands received from the second device and decreasing transmission power on the air interface by a decremental amount in response to each of one or more power-decrement commands received from the second device, each power-increment command being one of two opposite types of power-control command, and each power-decrement command being the other of the two opposite types of power-control command;

while operating in the dynamic-power state, upon receiving a first sequence of a first threshold number of alternating types of power-control commands from the second device, the first sequence ending with a last power-control command, transitioning to operating in a steady-power state in which the first device makes no adjustment of transmission power on the air interface in response to receiving power-control commands of either type from the second device;

while operating in the steady-power state, upon receiving from the second device a second sequence of a second threshold number of consecutive power-control commands all of a type opposite that of the last power-control command, the second sequence ending with a final power-control command, adjusting transmission power on the air interface in accordance with the type of the final power-control command, and transitioning to operating in a quasi-dynamic-power state in which the first device waits to receive a power-control command; and while operating in the quasi-dynamic-power state, upon receiving from the second device a new power-control command immediately subsequent to receiving the final power-control command, adjusting transmission power on the air interface in accordance with the type of the new power-control command, and transitioning to operating in (i) the steady-power state if the type of the new power-control command is opposite that of the final power-control command, or (ii) the dynamic-power state if the type of the new power-control command is the same as that of the final power-control command.

14. The method of claim 13, further comprising:

while operating in the steady-power state, upon receiving from the second device a single power-control command and no others, wherein the single power-control command is of a type that is the same as the last power-control command, adjusting transmission power on the air interface in accordance with the type of the single power-control command; and transitioning to operating in the dynamic-power state.

15. The method of claim 13, wherein the incremental amount is selected from the group consisting of a first absolute amount of transmission power, and a first fractional amount of a current transmission power level, and wherein the decremental amount is selected from the group consisting of a second absolute amount of transmission power, and a second fractional amount of the current transmission power level.

16. The method of claim 13, wherein the first device and the second device operate in a wireless communication system according to a CDMA family of protocols, wherein each power-increment command received at the first device is a power-up command sent from the second device to the first device on the air interface according to an inner-loop power-control protocol, and each power-decrement command received at the first device is a power-down command sent from the second device to the first device on the air interface according to the inner-loop power-control protocol, and wherein the first threshold number corresponds to a first positive integer number of CDMA transmission frames and the second threshold number corresponds to at least a second positive integer number of CDMA transmission frames.

17. The method of claim 13, wherein the first device is an access terminal operating in a wireless communication system that operates according to a CDMA family of protocols, and the second device is a base station that is part of the wireless communication system,
   wherein the air interface supports a forward link for communications from the base station to the access terminal and a reverse link for communications from the access terminal to the base station,
   and wherein each power-increment command received at the access terminal is a power-up command sent from the base station to the access terminal on the forward link according to an inner-loop power-control protocol, and each power-decrement command received at the access terminal is a power-down command sent from the base station to the access terminal on the forward link according to the inner-loop power-control protocol.

18. The method of claim 13, wherein the second device is an access terminal operating in a wireless communication system that operates according to a CDMA family of protocols, and the first device is a base station that is part of the wireless communication system,
   wherein the air interface supports a forward link for communications from the base station to the access terminal and a reverse link for communications from the access terminal to the base station,
   and wherein each power-increment command received at the base station is a power-up command sent from the access terminal to the base station on the reverse link according to an inner-loop power-control protocol, and each power-decrement command received at the base station is a power-down command sent from the access terminal to the base station on the reverse link according to the inner-loop power-control protocol.

19. In a first device communicatively coupled with a second device via an air interface, an improvement comprising:
   means for operating in a dynamic-power state in which the first device adjusts transmission power on the air interface in accordance with types of received power-control commands by increasing transmission power on the air interface by an incremental amount in response to each of one or more power-increment commands received from the second device and decreasing transmission power on the air interface by a decremental amount in response to each of one or more power-decrement commands received from the second device, wherein each power-increment command is one of two opposite types of power-control command, and each power-decrement command is the other of the two opposite types of power-control command;
   means for, while operating in the dynamic-power state, upon receiving a first sequence of a first threshold number of alternating types of power-control commands from the second device, wherein the first sequence ends with a last power-control command, transitioning to operating in a steady-power state in which the first device makes no adjustment of transmission power on the air interface in response to receiving power-control commands of either type from the second device;
   means for operating in the steady-power state and for, while operating in the steady-power state, upon receiving from the second device a second sequence of a second threshold number of consecutive power-control commands all of a type opposite that of the last power-control command, wherein the second sequence ends with a final power-control command,
      adjusting transmission power on the air interface in accordance with the type of the final power-control command, and
      transitioning to operating in a quasi-dynamic-power state in which the first device waits to receive a power-control command; and
   means for operating in the quasi-dynamic-power state and for, while operating in the quasi-dynamic-power state, upon receiving from the second device a new power-control command immediately subsequent to receiving the final power-control command,
      adjusting transmission power on the air interface in accordance with the type of the new power-control command, and
      transitioning to operating in (i) the steady-power state if the type of the new power-control command is opposite that of the final power-control command, or (ii) the dynamic-power state if the type of the new power-control command is the same as that of the final power-control command.

20. The improvement of claim 19, further comprising means for, while operating in the steady-power state, upon receiving from the second device a single power-control command and no others, wherein the single power-control command is of a type that is the same as the last power-control command,
   adjusting transmission power on the air interface in accordance with the type of the single power-control command, and
   transitioning to operating in the dynamic-power state.

21. The improvement of claim 19, wherein the incremental amount is selected from the group consisting of a first absolute amount of transmission power, and a first fractional amount of a current transmission power level,
   and wherein the decremental amount is selected from the group consisting of a second absolute amount of transmission power, and a second fractional amount of the current transmission power level.

22. The improvement of claim 19, wherein the first device and the second device operate in a wireless communication system according to a CDMA family of protocols,
   wherein each power-increment command received at the first device is a power-up command sent from the second device to the first device on the air interface according to an inner-loop power-control protocol, and each power-decrement command received at the first device is a power-down command sent from the second device to the first device on the air interface according to the inner-loop power-control protocol,
   and wherein the first threshold number corresponds to a first positive integer number of CDMA transmission frames and the second threshold number corresponds to at least a second positive integer number of CDMA transmission frames.

23. The improvement of claim 19, wherein the first device is an access terminal operating in a wireless communication system that operates according to a CDMA family of protocols, and the second device is a base station that is part of the wireless communication system,
   wherein the air interface supports a forward link for communications from the base station to the access terminal and a reverse link for communications from the access terminal to the base station, and wherein each power-increment command received at the access terminal is a power-up command sent from the base station to the access terminal on the forward link according to an inner-loop power-control protocol, and each power-decrement command received at the access terminal is a power-down command sent from the base station to the access terminal on the forward link according to the inner-loop power-control protocol.

24. The improvement of claim 19, wherein the second device is an access terminal operating in a wireless communication system that operates according to a CDMA family of protocols, and the first device is a base station that is part of the wireless communication system, wherein the air interface supports a forward link for communications from the base station to the access terminal and a reverse link for communications from the access terminal to the base station, and wherein each power-increment command received at the base station is a power-up command sent from the access terminal to the base station on the reverse link according to an inner-loop power-control protocol, and each power-decrement command received at the base station is a power-down command sent from the access terminal to the base station on the reverse link according to the inner-loop power-control protocol.

* * * * *